No. 28,071.   PATENTED MAY 1, 1860.
P. C. FRITZ.
MACHINE FOR SEPARATING GARLIC SEED FROM GRAIN.
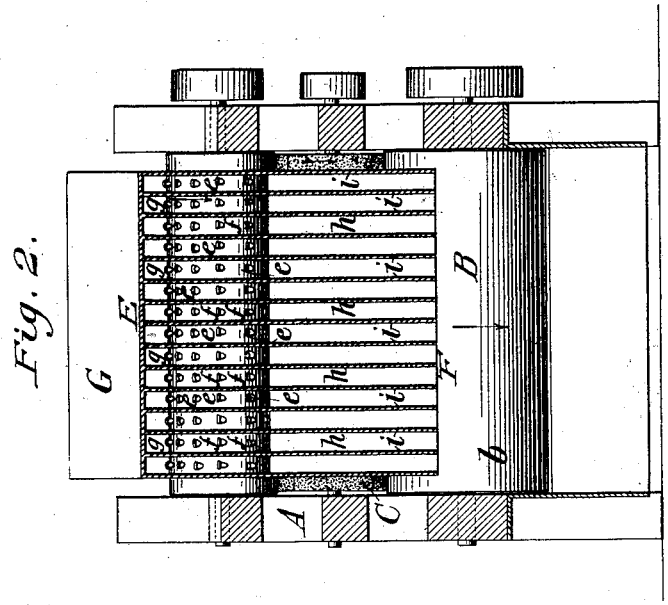
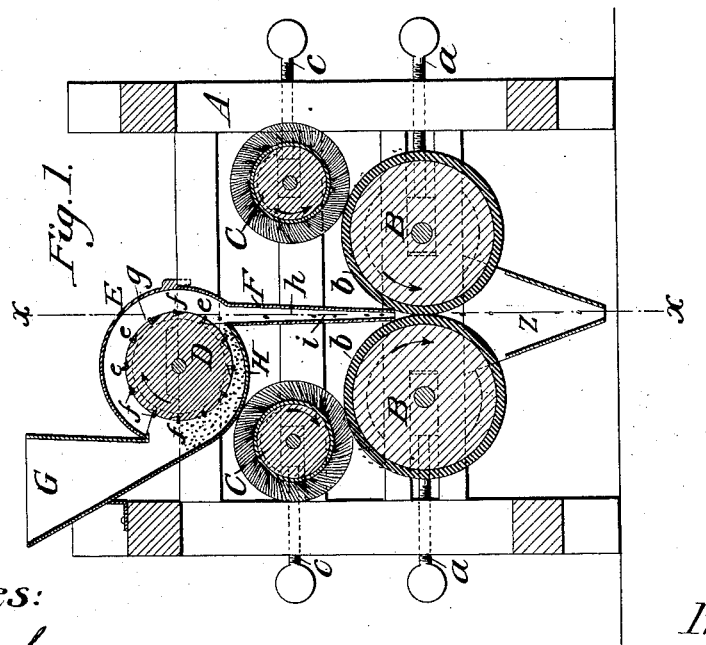
Witnesses:
Mich Hughes
Chs. M. Hughes
Inventor:
P. C. Fritz

UNITED STATES PATENT OFFICE.

PHILIP C. FRITZ, OF BARRYTOWN, NEW YORK.

GRAIN-CLEANER.

Specification of Letters Patent No. 28,071, dated May 1, 1860.

*To all whom it may concern:*

Be it known that I, PHILIP C. FRITZ, of Barrytown, in the county of Dutchess and State of New York, have invented a new and useful Machine for Separating Garlic from Grain; and I do hereby declare that the following is a full, clear, and exact description of the same, reference being had to the accompanying drawings, forming a part of this specification, in which—

Figure 1, is a vertical transverse section of my machine. Fig. 2, is a vertical longitudinal section of the same in the line $x, x$.

Similar letters of reference, in each of the several figures, indicate corresponding parts.

The nature of my invention consists in the combination of two garlic mashing rollers having india-rubber surfaces with two garlic discharging brushes or doffers and a wheat exit spout, when said rollers completely overhang or cover the mouth of the wheat exit spout, and run with their surfaces sufficiently close together to mash the garlic, and the brushes or doffers are situated in such relation to the broadest or uppermost end of the exit spout that the mashed garlic adhering to the rubber surfaces of the rollers is discharged or swept off from said rollers at such points outside of the range of the broadest end of the wheat exit spout as to render impossible the remingling of the garlic with the wheat.

To enable others, skilled in the art, to make and use my invention, I will proceed to describe its construction and operation.

B, B, in the accompanying drawings represent two revolving rollers having their circumference covered with india-rubber. These rollers run with their peripheries touching each other and have sliding bearings which are adjusted and held in place by means of set screws $a, a$. By means of these screws, the rollers can be forced very closely together and thereby made to act with sufficient force upon the substances passing between them to accomplish the end desired, viz., mash the garlic which is mixed with the wheat, without cracking the wheat. It should be observed here that garlic is quite soft compared with wheat and therefore while the wheat passes through unharmed, the garlic will be mashed as flat as a wafer. It should also be observed that garlic is of a sticky adhesive nature and therefore when mashed between india-rubber surfaces it sticks or adheres with considerable tenacity to the rubber surfaces.

Z, is a wheat exit spout placed under the rollers. This spout in its transverse section, is of funnel shape. Its upper end, just a little more than clears the surface of the two rollers and incloses about one-sixth of the circumference of each of the same. The object in thus making the spout narrow is that the garlic when brushed off or doffed from the roller shall not fall into it and commingle with the wheat.

C, C, are two revolving brushes or doffers having sliding bearings which are adjusted by screws $c, c$. They are situated so as to touch the circumference of the india rubber surfaced rollers at such points that the garlic shall be doffed or cleared from the same outside of the range of the mouth of the wheat exit spout and thus a recommingling of the garlic with the wheat avoided. Instead of using brushes, stationary rigid doffers might be employed, provided the same be so located as to doff the garlic at points outside the range of the mouth of the wheat exit spout.

In describing the operation of my invention, I deem it proper to refer to an arrangement for feeding the grain which was patented to me December 21st, 1858. The kernels of grain and garlic are taken singly by cups $e, f$, from the hopper H, and conducted by the spouts $h, h, h$, between the revolving india rubber surfaced rollers B, $b$, and at this point a separation of the garlic from the wheat takes place as follows: If wheat alone has been passed to the india-rubber surfaced rollers, then the only operation that takes place is the discharge of the same into the exit spout Z. But if a seed of garlic has been conducted down, then the garlic is mashed and caused to adhere to the rubber surfaced rollers, and as the rollers continue their revolution, the mashed garlic seed is carried around until it comes in contact with brushes or doffers C, C, when it is thrown off laterally into a different receptacle than that which the kernel of wheat was discharged into. The operation of course is a continous one and there may be some fifty or a hundred kernels of wheat discharged and an equal quantity of garlic seed mashed during each revolution of the cylinders.

The gist of my invention lies in this, viz., the mashing of the garlic between the same rollers that conduct the wheat unharmed, to its exit spout and at the same time having the garlic to adhere to these rollers so that it may be carried around and be discharged at points which are out of the range of the upper end of the wheat exit spout.

What I claim as my invention and desire to secure by Letters Patent, is—

The combination of the garlic mashing india rubber surfaced rollers B, b, garlic discharging brushes or doffers C, C, and wheat exit spout Z, the whole being constructed and arranged and operating substantially as and for the purposes set forth.

P. C. FRITZ.

Witnesses:
 CHS. M. HUGHES,
 MICH. HUGHES.